:::
United States Patent Office 2,949,167
Patented Aug. 16, 1960

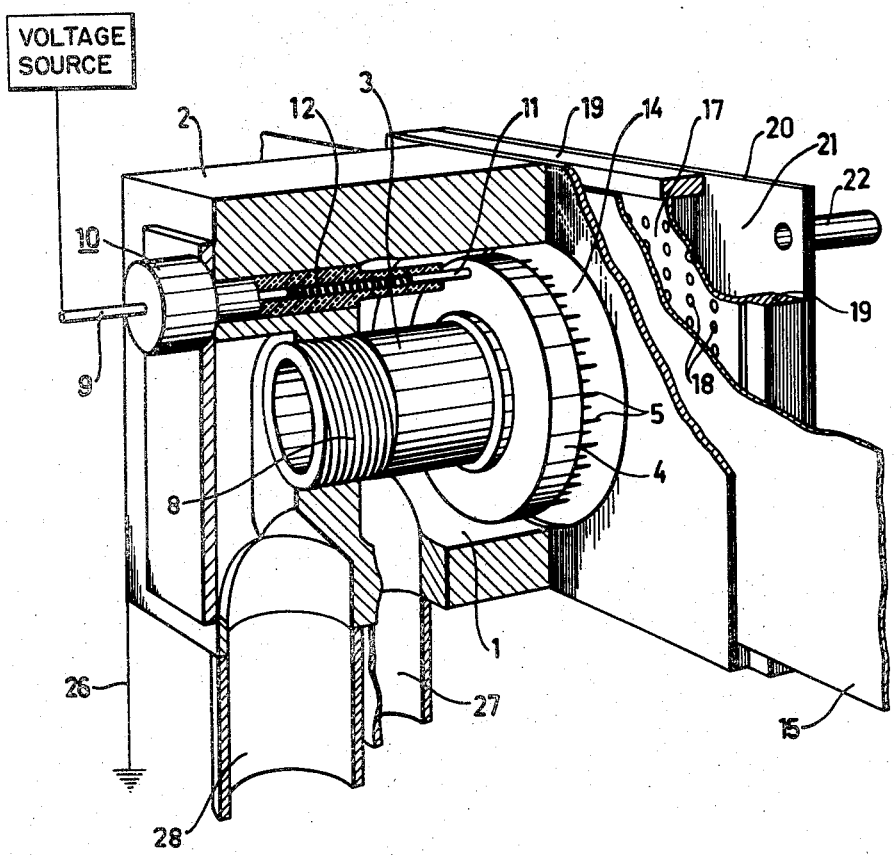

2,949,167
ELECTROSTATIC PRECIPITATOR

Bengt Allan Bergstedt, Solna, Sweden, assignor to Aktiebolaget Atomenergi, Stockholm, Sweden, a Swedish company Filed June 4, 1956, Ser. No. 589,131

Claims priority, application Sweden June 8, 1955

4 Claims. (Cl. 183—7)

This invention relates to an improvement of electrostatic precipitators, based on a new principle of charging and precipitation of the dust particles.

There are two types of electrostatic precipitators, the Cottrell precipitator and the two stage precipitator, differing in the method of charging and collection of the particles in the aerosol being treated. In the Cottrell precipitator the gas passes a tube, in the centre of which there is a fine wire. When the wire, which serves as an emission electrode, is brought to a sufficiently high voltage relative to the tube a corona discharge starts at the wire, and it becomes a source of unipolar ions. Due to the electric field the ions drift towards the wall of the tube. The precipitation of the particles in an aerosol being fed through the precipitator is due to the charging of the particles when they move in the space charge region set up by the discharge. Because of the electric forces on the charged particles they also move towards the tube wall, where they are discharged and precipitated. The corona discharge usually comes from irregularly spaced points on the surface of the wire. By their drift in the electric field the ions will transfer momentum in the impacts with the gas molecules. In this way an "electric wind" towards the wall will be produced by the ions. This wind cannot, however, give an ordered net movement of the dust particles towards the collection surface in present types of precipitators, partly because, due to the fact that the discharges are usually unsteady and the ion-emitting source is too far from the collection surface, the electric wind will in the mean transport as many particles from the collection surface as in the opposite direction. The only effect of the electric wind is an increase in the turbulence of the gas. (See W. Deutsch in Ann. der Physik 9, page 249–264 (1931).) The effective drift velocity of the particles towards the collection surface will then be determined solely by the electric forces on the particles, which are restricted because the electric field strength obtainable is determined by the space charge.

In the two stage precipitator the charging of the particles is made by passing the aerosol through the space charge region of a corona discharge. The charged particles are then precipitated in an electric field between a plurality of parallel plates. The effective drift velocity of the particles is of the same order of magnitude as in the Cottrell precipitator.

The importance of the effective drift velocity of the particles towards the collection surface is evident from the following equation for the collection efficiency $p$ of the electrostatic precipitator, defined as $$p = \frac{n_0 - n}{n_0}$$

where $n_0$ and $n$ are the number of particles in the aerosol per unit volume at the input and output of the precipitator, respectively $$p = 1 - e^{-\frac{Sv}{q}}$$

where $S$ = the area of the collection surface,
$v$ = the effective drift velocity of the particles towards this surface and
$q$ = the gas flow rate through the precipitator.

It should be noted that this equation can be considered as a definition of $v$, since other magnitudes can easily be measured.

For a given efficiency $p$ the exponent $$\frac{Sv}{q}$$

will be constant, and an increase in $v$ by a specified factor means that the flow rate $q$ can be increased or the collection surface area $S$ can be decreased by the same factor. From this it is evident that the precipitator could be made more compact if $v$ could be increased. Compactness often is a most desirable property of a precipitator.

A solution to the problem of increasing the effective drift velocity $v$ of the particles is given by the invention to be described.

The electrostatic precipitator according to the invention comprises an ion-emitting electrode and a collection electrode and devices for establishing the electric field therebetween, said ion-producing a corona discharge therebetween, said ion-emitting electrode comprising a multitude of mutually stationary discharge points, for example in the form of metallic points or nails, distributed in front of the flat or curved surface of the collection electrode over a given active area thereof and having at least such large a mutual distance that, when the normal operating voltage is applied, the total impingement area of the broomshaped conical corona discharged upon said active area is only a portion of said active area, preferably about half that area, the distance between the point and the collection electrodes being such that the electric wind produced by the electric field present gets a linear velocity at the collection electrode which exceeds the linear velocity at the same place of the collection electrode of said aerosol being fed through the precipitator.

The corona discharge extending from a point emission electrode towards the collection surface is broomlike and has the approximate shape of a cone with the apex at the discharge point and the base at the collection surface, the total apex angle of the cone being, as a rule, about 50–75°, e.g. around 60°. In each separate point to plane discharge a fast electric wind towards the surface is obtained near the latter if the point to plane distance is not too large. As pointed out above this distance must not be larger than to warrant an electric wind velocity in the vicinity of the collection surface, which is greater than or at least of the same order of magnitude as the linear velocity at the surface of the gas passing the precipitator, which condition can be observed by the bending off of the discharge cones in the direction of the gas stream. In the vicinity of the surface the aerodynamic stream lines in the electric wind bend off and pass close to the surface outwards from the centre of the discharge cone. In the space charge region between the point and the plane the electric field strength is low, but in a thin layer of the order of 0.1 millimetres the space charge density rapidly diminishes to zero, which gives a very high field strength in this layer. The particles in an aerosol being fed to the discharge are rapidly transported to this layer by the electric wind. The velocity of the particles towards the collection surface will be very high in this layer due to the high electric field strength, though the linear gas velocity is also high in this layer. This presupposes that the space between the separate discharges must be large enough to admit the return flow, and for this reason the distance between the discharge points must be large enough for this condition to be fulfilled. In practice this will be the case if the points are separated so that the discharges do not materially interfere with each other but a continuous discharge is obtained between substantially each point and the collection electrode. It is characteristic for the device according to the invention that the particles are separated practically only within the impingement area of the discharge cone. Therefore the total impingement area should, on the other hand, comprise as large a portion as possible of the active area of the collection surface. It is advantageous not to make the distance between the points much greater than the point to plane distance.

Measurements have shown that more than ten times higher effective particle drift velocity $v$ can be obtained with this method compared to the particle velocities $v$ in present electrostatic precipitators.

The invention will now be described with reference to one embodiment of an electrical precipitator according to the invention illustrated in the attached drawing showing a perspective view of the apparatus with its hithermost portions broken away for a better exposition of the interior.

In a cylindrical cavity 1 of a filter housing 2, which may be made of brass, there is fitted, upon a tubular insulator 3 and concentrically thereto, an annular high voltage emission electrode 4 having an outer diameter of, for instance, 5 centimeters and being provided with a plurality, e.g. on the order of one hundred points 5. The electrode 4 is axially movable due to the fact that insulator 3 is secured to a bushing 8 threaded in the housing 2. The precipitator is fed with electric current supplied to the electrode 4 through an insulator attachment fitted in a boring in the housing. A conduit 9 is inserted in the outer end of the insulating body 10. An axially movable pin 11 is inserted in the inner end thereof. Between conduit 9 and pin 11 there is a compression spring 12 arranged so as always to press the pin 11 against the electrode 4 irrespective of the axial position thereof. The current passes as corona discharge from the points 5 towards a collecting surface 14 which is a portion of a band 15 of electrically conducting material, such as aluminium, and serves as precipitation electrode. In order to prevent the band from being sucked against the high voltage electrode 4, when the precipitator, as it should do, operates at sub-pressure relative to the surrounding atmosphere, a suction plate 17 provided with a plurality of orifices opens into chamber 21 formed by flanges 19 on the suction plate 17 and a cover plate 20 and connected to a suction device (not shown) over a connection pipe 22. Thereby the chamber 21 will attain a lower pressure than that prevailing at the other side of the band where the discharge takes place. The gas to be treated enters into the cavity 1 through the inlet 27, is distributed round the periphery of the electrode 4 and passes through the discharge between the points 5 and the collection surface 14. In the figure it has been presumed that the direction of flow of the gas is from the periphery of the high voltage electrode 4 to the central opening thereof, from where the gas is exhausted through the insulator 3, the bushing 8 and the outlet 28. The opposite flow direction may also be employed as well as other modes of passing the gas to and from the discharge region in front of the collecting surface. The band 15 may be replaced by a plate or the like of conducting material.

A suitable arrangement in a precipitator for measurement purposes is to make the point to plane distance about 5 millimeters and a mean distance between the points of about 4 millimeters, the points being placed in rows with a distance of about 5 millimeters between the rows and about 3 millimeters between adjacent points in the same row. This gives a total of about 120 points. A suitable mean discharge current of approximately 15 microamperes per point is obtained at an operating voltage of approximately 8.5 kilovolts.

In one case the described apparatus was used for determining the concentration of radio activity in a radioactive aerosol. The air flow rate was constant equal to 0.575 cubic meter per minute. The efficiency at this flow rate, at a corona current of 1.60 milliamperes and for a gap distance of 5.60 millimeters was determined to be 16.6%. The collection surface was 16.0 square centimeters. This gives the value 1.1 meter per second for $v$ of the equation given above, which is more than 10 times the limiting particle velocity for this size of particles measured in previous electrical precipitators.

In the above example negative corona has been used but it is also possible to use a positive corona but this generally gives a lower mean particle velocity $v$.

In an electrostatic precipitator for industrial gas cleaning the voltage and the dimensions just mentioned should be made larger, they can in this case be made up to 5 to 10 times as great.

What is claimed is:

1. An electrostatic precipitator for aerosols comprising a housing having a cylindrical chamber therein, a tubular emission electrode coaxially arranged in and spaced from the wall of said housing chamber, said emission electrode having a planar end surface transverse to the longitudinal axis thereof and a plurality of mutually spaced point electrodes of equal length projecting from said end surface over a given active area thereof, a collection electrode having a planar precipitation surface parallel to and spaced from the plane defined by the tips of said point electrodes, means for applying a high electric potential to said emission electrode to cause each point electrode to produce a broomshaped conical corona discharge having an apex angle of about 50–75°, and conduit means in said housing for creating a passage of the aerosol in either direction about the outside periphery of said tubular emission electrode, through the space between said emission electrode and said collection electrode, and through the inner portion of said emission electrode.

2. An electrostatic precipitator as defined in claim 1 wherein said collection electrode comprises a band of electrically conducting material, and further including suction means on the side of said collection electrode band opposite from said emission electrode for retracting by suction the collection electrode away from said emission electrode.

3. An electrostatic precipitator as defined in claim 1 wherein said collection electrode is spaced from the tips of the emission electrode by such a distance that the total impingement area of the broomshaped conical coronas discharged thereon is only a portion of its total active area so that each discharge will reach and impinge the collection electrode surface without interference with adjacent surrounding discharges.

4. An electrostatic precipitator as defined in claim 3 wherein the emission point electrodes have a length of approximately 5 millimeters, wherein the spacing between the tips of said point electrodes and said collection electrode is approximately 6 millimeters, and wherein an operating potential of approximately 8.5 kilovolts is applied to said emission electrode.

References Cited in the file of this patent

UNITED STATES PATENTS

| | | |
|---|---|---|
| 1,869,772 | Paterniti | Aug. 2, 1932 |
| 2,195,431 | Shively et al. | Apr. 2, 1940 |
| 2,505,907 | Meston | May 2, 1950 |